Oct. 15, 1929. J. H. WILLIAMS 1,731,805
LIQUID MEASURING AND DISPENSING APPARATUS
Filed Jan. 22, 1929
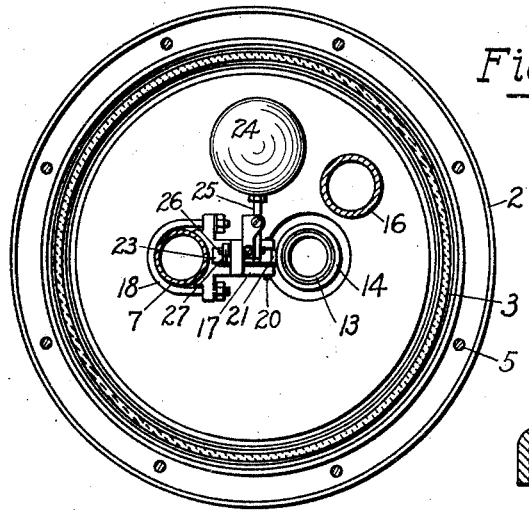
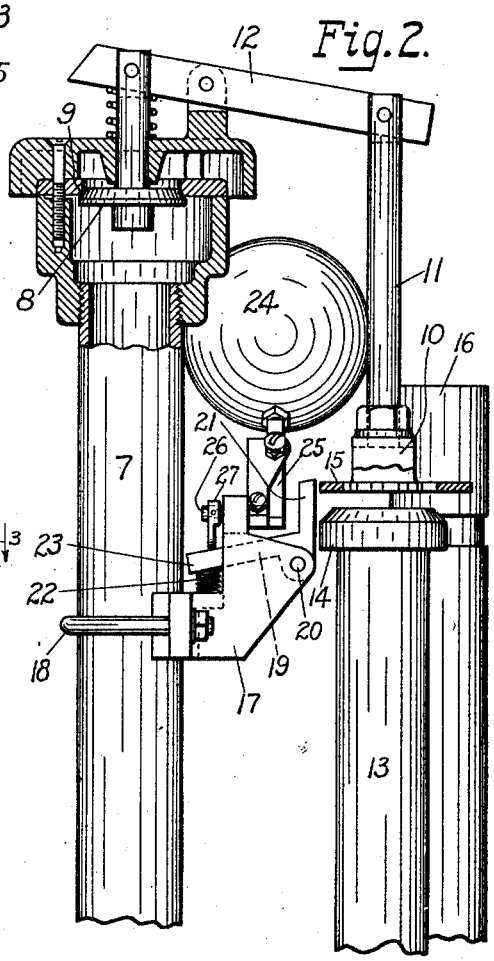
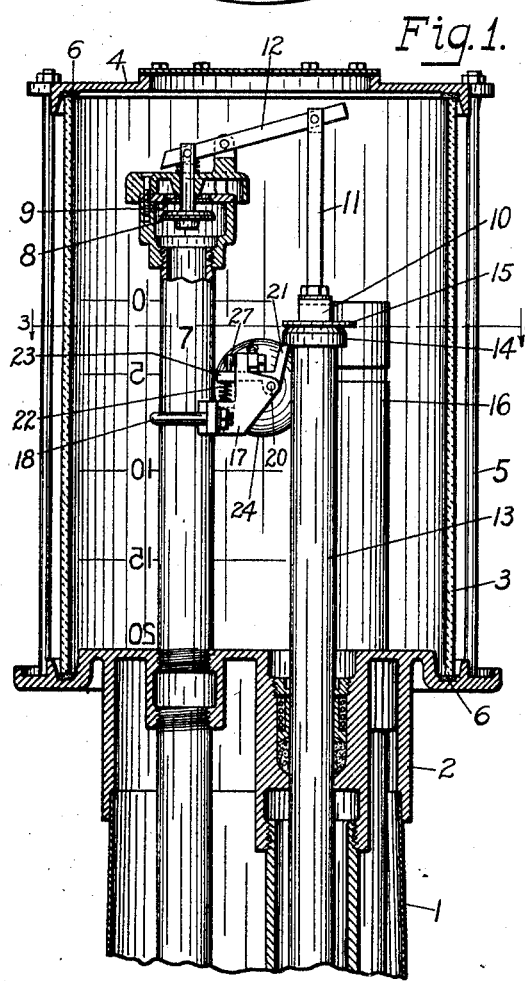
James H. Williams
INVENTOR
BY Walter A. Knight
and Bennett R. Knight
ATTORNEYS Patented Oct. 15, 1929

1,731,805

UNITED STATES PATENT OFFICE

JAMES H. WILLIAMS, OF FORT WAYNE, INDIANA, ASSIGNOR TO WAYNE COMPANY, OF FORT WAYNE, INDIANA, A CORPORATION OF INDIANA

LIQUID MEASURING AND DISPENSING APPARATUS

Application filed January 22, 1929. Serial No. 334,235.

My invention relates to liquid measuring and dispensing apparatus of the so-called visible type, that is having a transparent elevated container from which liquid is dispensed within the view of the customer. Such apparatus is used extensively for serving gasoline. More particularly my invention relates to means for preventing the operator from beginning to serve a customer with liquid before the container has been filled to the level required for maximum capacity serving.

Such apparatus has a fill tube through which the liquid is supplied to the elevated container, an overflow tube terminating within the container at the level for maximum capacity serving and adapted to return to the storage tank all liquid in excess of enough to fill the container to that level, and a vertically adjustable serve tube whose top may be positioned at any one of various levels within the container, to serve the customer with the qantity of liquid that he desires.

Before any new serving is begun the discharge tube should be raised to its highest position and the liquid supplied to the elevated container through the fill tube until it stands at the maximum capacity level, that is at the top of the overflow tube. The serve tube is then lowered sufficiently to deliver the quantity of liquid the customer is to receive, and the customer relies upon it that the liquid which he has seen flow from the elevated container has been delivered into the tank of his car.

It is well known that some operators of such apparatus cheat customers by lowering the serve tube while the liquid in the elevated container is agitated from the flow of liquid forced into it and before it has reached the maximum capacity level. Few customers would notice such improper manipulation of the apparatus.

The principal object of my invention is to make it impossible for the operator to begin to lower the serve tube until after the elevated container has been filled to the maximum capacity level.

In the particular embodiment of my invention selected for illustration:—

Figure 1 is a vertical section through the top portion of the housing and the elevated container of a gasoline measuring and dispensing apparatus and the fill valve, with the parts in so-called fill position, that is in position to begin forcing gasoline into the container in preparation for another serving.

Fig. 2 is a similar but enlarged view of the various tubes and attendant parts only, the fill lift casting being broken away and its plate sectioned, the parts being in position they would be when the elevated container had been filled to maximum capacity and the serve tube slightly lowered, that is when serving has begun, and Fig. 3 is a cross section on the line 3—3 of Figure 1.

Referring now to the drawings, 1 is the housing forming the pedestal of the apparatus, surmounted by the bottom head 2, upon which is seated a glass cylindrical elevated container 3 for the gasoline to be dispensed, and a top head 4 rests on the top of the container 3, the rods 5 securely clamping the container 3 against cork gaskets 6 between the heads 2 and 4.

Gasoline is forced into container 3 by a pump or other suitable means (not shown) through fill pipe 7. The fill valve structure shown is covered by Letters Patent No. 1,673,545, issued June 12th, 1928, on the application of Linnaeus E. Baker and William F. Brandt. The poppet valve 8 is normally closed against its seat 9 by the weight of fill lift casting 10 and its rod 11 through pivoted lever 12.

An open topped serve tube 13 has a collar 14 with a substantially square shoulder underneath. When the tube 13 is raised preparatory to filling the container 3 the top end of this tube is pressed against the underside of the plate 15 of the fill lift casting 10 shifting the parts from the positions shown in Fig. 2 into the positions shown in Fig. 1. The fill lift casting 10 has its upper portion formed as a forked crib and its plate 15 perforated to allow gasoline to flow through it.

An overflow pipe 16 is fixed with its open top on a level with the maximum capacity level designated as 0, so that all gasoline forced into the container 3 in excess of that quantity will flow back to the storage tank (not shown).

A bracket 17 is secured in a suitable manner as by U-bolt 18 to some conveniently located fixed part of the structure as the fill pipe 7. A latch consisting of a bent lever 19 pivoted to the bracket 17 at 20 has its upper end 21 normally pressed to the right into the position shown in Fig. 1 of the drawings by a light coiled spring 22 on the under side of the lower end 23.

When the fill pipe 13 is sufficiently raised the collar 14 presses this upper end 21 of the latch to the left as shown in the drawings, and when the collar has passed the latch its upper end 21 passes under the collar 14 and so long as the latch remains in that position impinges upon the shoulder of the collar and prevents the operator from lowering the fill tube.

A float ball 24 has a stem 25 secured to a stud 26 which is loosely journalled in the bracket 17 above the end 23 of the bent lever 19. To the end of this stud 26 above the end 23 of the bent lever 19 is fixed a trip finger 27 so set that when the float ball 24 is lowered as shown in Fig. 1 it is clear of the lever end 23, but when the float ball is raised as shown in Fig. 2 the trip finger 27 bears upon the lever end 23 depressing it and moving the lever end 21 to the left out of engaging position with the shoulder of the collar 14.

It will be readily understood that when the serve tube 13 has been raised, preparatory to refilling the elevated container 3 to the position shown in Fig. 1, the latch 21 prevents the serve tube from being lowered until enough gasoline has been supplied to the container to bring the level of the gasoline therein above the top of the overflow tube 16 at which time the float 24 will have been raised to the position shown in Fig. 2, moving the latch from collar engaging position.

The container is now filled with gasoline to the 0 level, so the operator may now properly lower the serve tube, and the customer is assured of receiving the quantity of gasoline that he observes flowing from the container.

Although a preferred form of the invention has been shown and described it will be understood that a mechanic, working within the scope of what is claimed, may make changes without departing from the spirit of my invention.

I claim as my invention and desire to secure by Letters Patent of the United States:—

1. In combination with a liquid measuring and dispensing apparatus having an elevated container from which the liquid is dispensed, a fixed overflow tube to return to storage all liquid within said container above the level of maximum capacity for serving, a serve tube whose inlet is vertically adjustable within said container, latch means preventing the lowering of said serve tube when raised preparatory to refilling the container until said container has been filled to said maximum capacity level, and means for releasing said latch operable by the liquid in said container when said liquid has reached said maximum capacity level.

2. In combination with a liquid measuring and dispensing apparatus having an elevated container from which the liquid is dispensed, a fixed overflow tube whose open upper end terminates at maximum capacity for serving within said container, a vertically adjustable serve tube whose open upper end is within said container, a latch engaging means on said serve tube, a latch to engage said latch engaging means and prevent the lowering of said serve tube while so engaged when the serve tube is raised preparatory to refilling said container, a float and means operable by said float when the liquid in said container has reached said maximum capacity level for moving said latch out of said engaging position.

3. In combination with a liquid measuring and dispensing apparatus having an elevated container from which the liquid is dispensed, a fixed overflow tube to return to storage all liquid in said container above the level of maximum capacity for serving, a serve tube whose inlet is vertically adjustable within said container, a detent on said fill tube, a bracket secured to a fixed portion of the apparatus within the container, a latch pivoted to said bracket and adapted to engage said detent and prevent the lowering of said fill tube when said fill tube is raised preparatory to refilling the container, a float pivoted to said bracket and means operable by said float when the liquid in said container has reached said maximum capacity level for moving said latch out of detent engaging position.

In testimony whereof I have hereunto set my hand.

JAMES H. WILLIAMS.